US012803499B2

(12) United States Patent
Mullen et al.

(10) Patent No.: US 12,803,499 B2
(45) Date of Patent: Nov. 17, 2026

(54) SYSTEM AND METHOD FOR IDENTIFYING AND MAPPING SOLAR PANELS IN A PHOTOVOLTAIC ARRAY NETWORK

(71) Applicant: Optivolt Labs, Inc., San Francisco, CA (US)

(72) Inventors: Jonathan Thomas Mullen, Redwood City, CA (US); Linda Stacey Irish, San Diego, CA (US); Sierra Rae King, San Francisco, CA (US)

(73) Assignee: Optivolt Labs, Inc., San Francisco, CA (US)

( * ) Notice: Subject to any disclaimer, the term of this patent is extended or adjusted under 35 U.S.C. 154(b) by 0 days.

(21) Appl. No.: 19/353,545

(22) Filed: Oct. 8, 2025

(65) Prior Publication Data

US 2026/0171965 A1 Jun. 18, 2026

Related U.S. Application Data

(60) Provisional application No. 63/750,618, filed on Jan. 28, 2025, provisional application No. 63/704,894, filed on Oct. 8, 2024.

(51) Int. Cl.

| | |
|---|---|
| ***H02S 50/10*** | (2014.01) |
| ***H02J 3/46*** | (2006.01) |
| ***H02J 13/13*** | (2026.01) |
| ***H02J 13/14*** | (2026.01) |
| ***H02J 13/181*** | (2026.01) |
| *H02J 101/24* | (2026.01) |

(52) U.S. Cl.
CPC ................ *H02S 50/10* (2014.12); *H02J 3/46* (2013.01); *H02J 13/1311* (2026.01); *H02J 13/1331* (2026.01); *H02J 13/14* (2026.01); *H02J 13/181* (2026.01); *H02J 2101/25* (2026.01)

(58) Field of Classification Search
CPC ..... H02S 50/10; H02J 13/181; H02J 13/1331; H02J 13/1311; H02J 13/14; H02J 3/46
See application file for complete search history.

(56) References Cited

U.S. PATENT DOCUMENTS

2019/0027617 A1 * 1/2019 Varlan .................... H02H 1/003

* cited by examiner

*Primary Examiner* — Tae-Sik Kang
(74) *Attorney, Agent, or Firm* — Run8 Patent Group, LLC; Peter Miller

(57) ABSTRACT

One variation of a method includes: triggering solar devices, arranged in a set of solar strings in a solar array installed on a structure, to output a fixed direct-current voltage in an test mode; triggering a first solar device in the set to output a first alternating test signal at a first modulation frequency during a first test period; and identifying a first solar string, in the set of solar strings, containing the first solar device and the second solar device and excluding the third solar device in response to a) receipt of a first inbound signal, characterized by the first modulation frequency, at the second solar device during the first test period and b) absence of receipt of the first inbound signal at the third solar device during the first test period.

20 Claims, 5 Drawing Sheets

SYSTEM AND METHOD FOR IDENTIFYING AND MAPPING SOLAR PANELS IN A PHOTOVOLTAIC ARRAY NETWORK

CROSS-REFERENCE TO RELATED APPLICATIONS

This Application claims the benefit of U.S. Provisional Patent Application Nos. 63/750,618, filed on 28 Jan. 2025 and 63/704,894, filed on 8 Oct. 2024, each of which is hereby incorporated in its entirety by this reference.

This Application is related to U.S. patent application Ser. No. 18/610,983, filed on 20 Mar. 2024, U.S. patent application Ser. No. 18/129,321, filed on 31 Mar. 2023, and U.S. Provisional Application No. 63/326,121, filed on 31 Mar. 2022, each of which is hereby incorporated in its entirety by this reference.

TECHNICAL FIELD

This invention relates generally to the field of photovoltaics and, more specifically, to a new and useful system and method for identifying and mapping solar panels in the field of photovoltaics.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method: String Identification+Coordinated Power Point Tracking

Figure 1:
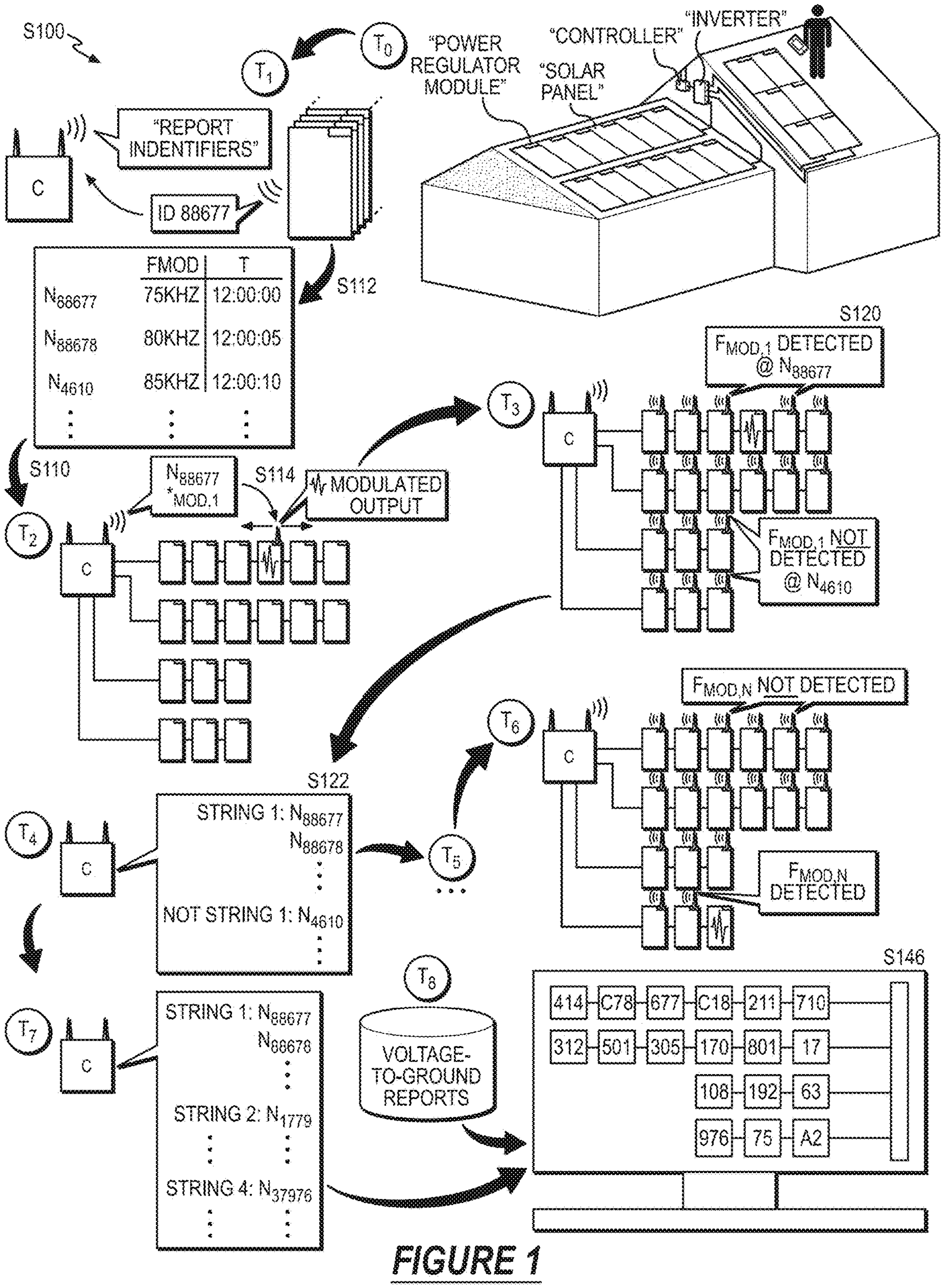
FIG. 1 is a flowchart representation of a method.
Figure 2:
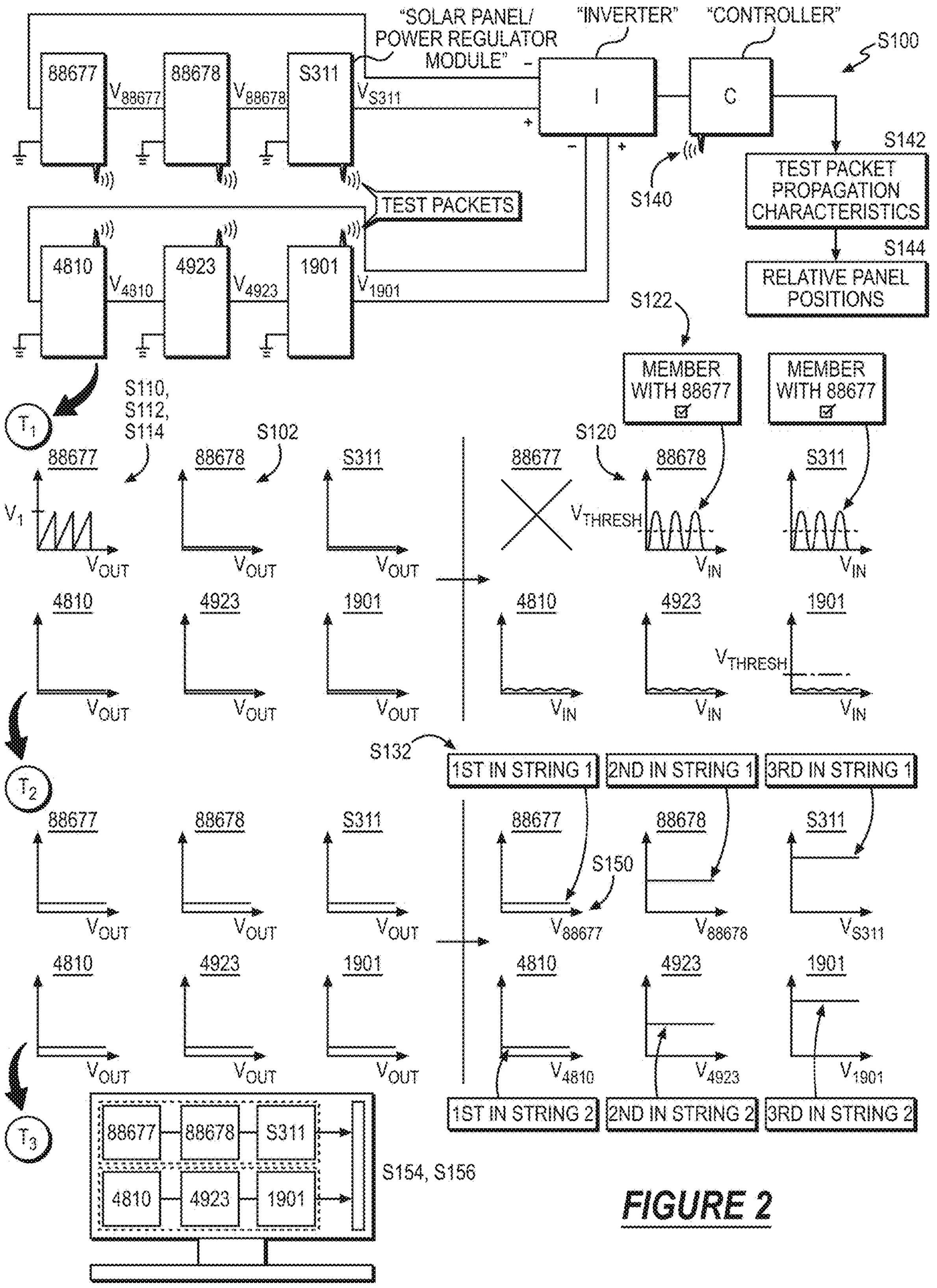
FIG. 2 is a flowchart representation of one variation of the method.
Figure 3:
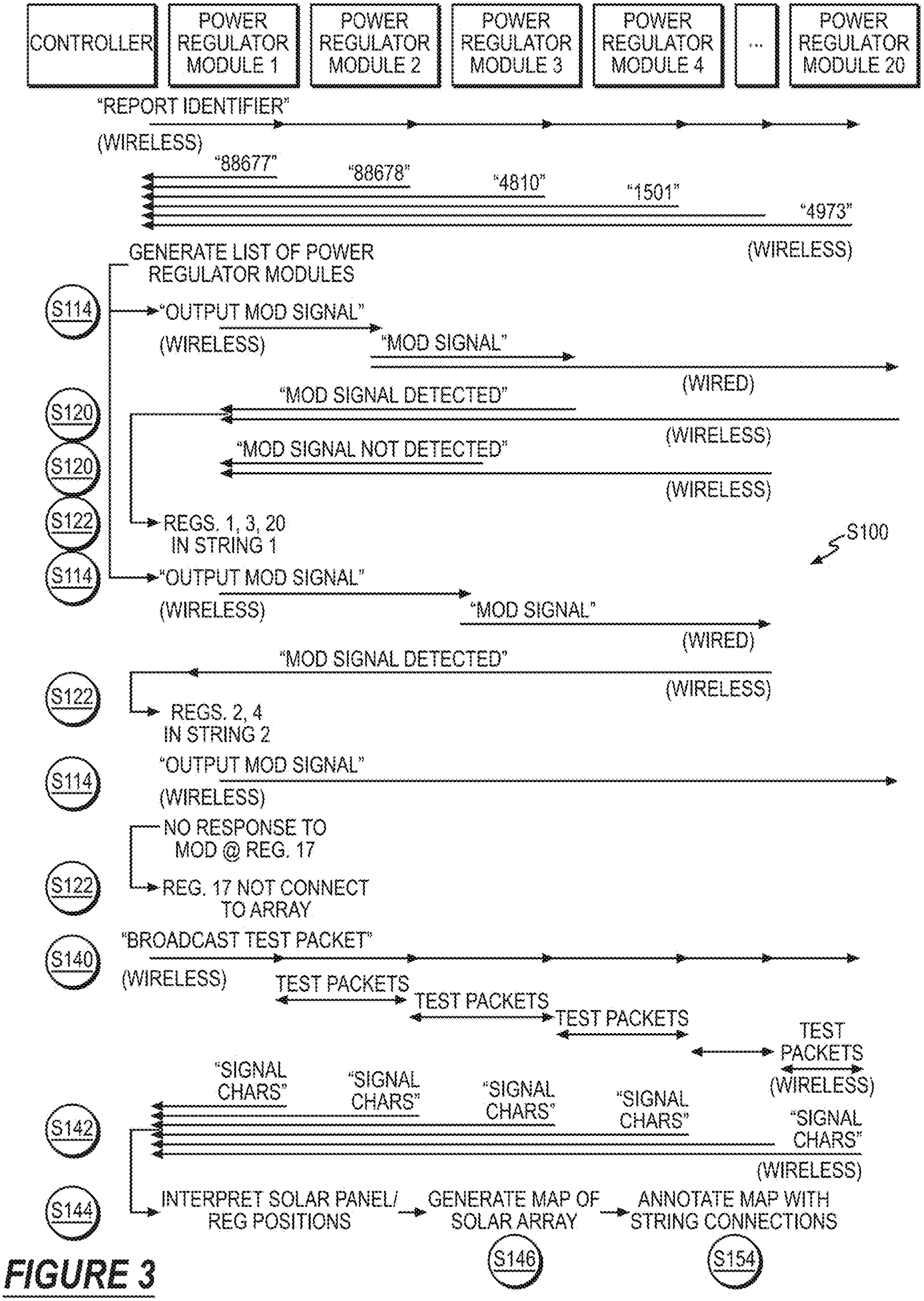
FIG. 3 is a flowchart representation of one variation of the method.

As shown in FIGS. 1, 2, and 3, a method S100 for identifying and mapping solar panels—in a set of solar strings in a solar array located on a structure—includes, during a string identification period: selecting a first power regulator module (e.g., a module-level power electronic device) in a network of power regulator modules, each coupled to one solar panel in the solar array in Block S110; assigning, to the first power regulator module, a first power modulation frequency (e.g., 50 Hertz) for uniquely associating the first power regulator module to a first solar panel in the set of solar panels in Block S112; and triggering the first power regulator module to generate a first modulated power signal that induces output of modulated power signals across the network of power regulator modules in block S114.

The method S100 further includes, during the string identification period: reading a second modulated power signal from a second power regulator module in the network of power regulator modules in Block S120; and, in response to the second modulated power signal exhibiting the first power modulation frequency, identifying membership of the second power regulator module in a first solar string, in the solar array, with the first solar panel (e.g., connected in series with the first solar panel to form the first solar string in the solar array) in Block S122.

1.1 Variation: Coordinate Maximum Point Tracking

Figure 4:
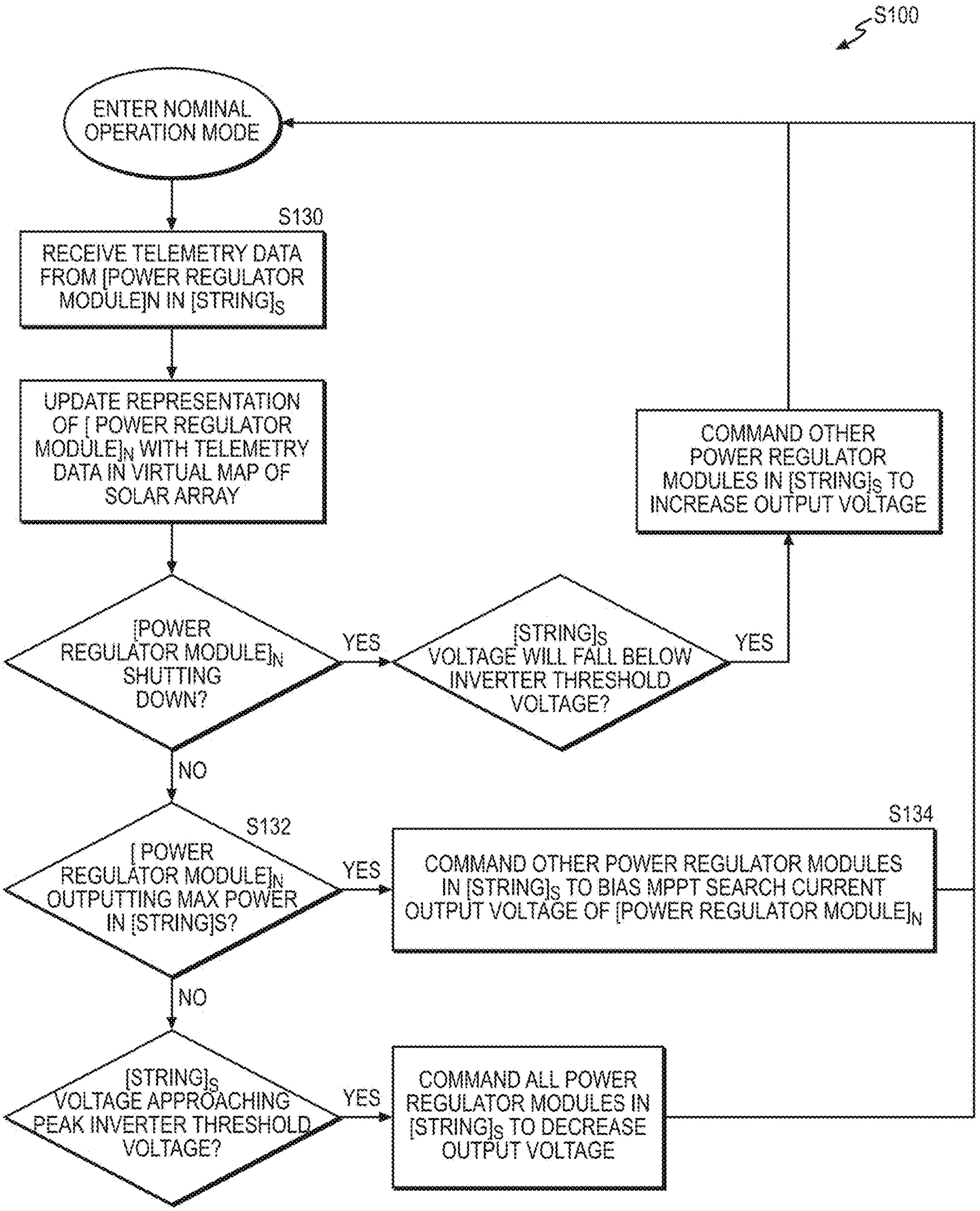
FIG. 4 is a flowchart representation of one variation of the method.

One variation of the method S100 shown in FIG. 4 also includes, during a voltage regulation period following the string identification period: detecting power output of the first power regulator module exceeding power output of all other solar panels in the first solar string in Block S130; and accessing a first output voltage value of the first power regulator module in Block S132. This variation of the method S100 further includes, at the second solar panel—during the voltage regulation period, based on membership of the second solar panel in the first solar string with the first solar panel, and in response to power output of the first power regulator module exceeding power output of all other solar panels in the first solar string—biasing search for a maximum power point voltage at the second solar panel proximal the first output voltage value in Block S134.

1.1 Variation: Solar String Mapping

In one variation shown in FIG. 3, the method S100 further includes: triggering power regulator modules, in the network of power regulator modules, to wirelessly broadcast test packets in Block S140; accessing a set of propagation characteristics of test packets broadcast and received by the set of power regulator modules in Block S142; calculating a set of relative positions of the set of power regulator modules based on the set of propagation characteristics in Block S144; and generating a virtual map of the solar array based on the set of relative positions of the set of power regulator modules in Block S146.

As shown in shown in FIG. 2, this variation of the method also includes: accessing a set of voltage-to-ground values read by power regulator modules in the network of power regulator modules in Block S150; and interpreting a first sequence of solar panels in the first solar string based on differences in voltage-to-ground values read by power regulator modules connected to solar panels in the first solar string in Block S152; annotating the virtual map with a set of interconnection icons representing wired interconnections between solar devices in each solar string in the set of solar strings in Block S154, wherein the set of interconnection icons includes a first interconnection icon representing wired interconnection between the first solar device and the second solar device based on the first sequence and the first membership; and annotating the virtual map with a set of bounding boxes encircling representations of groups of solar devices in each solar string in the set of solar strings in Block S156, wherein the set of bounding boxes includes a first bounding box encircling the first solar device and the second solar device and identifying the first solar string based on the first membership.

1.2 Variation: Solar Panels+Solar String Membership

One variation of the method shown in FIGS. 1, 2, and 3 includes: triggering solar panels, in a set of solar panels arranged in a set of solar strings in a solar array installed on a structure and connected to an inverter, to output a fixed direct-current voltage in a test mode in Block S102, the set of solar strings including a first solar string and a second solar string, the set of solar panels including a first solar panel (e.g., a first solar substring arranged in a common housing and connected to one power regulator module), a second solar panel, and a third solar panel; triggering the first solar panel to output a first alternating test signal at a first modulation frequency during a first test period in Block S114; detecting a first membership of the first solar panel and the second solar panel in the first solar string based on receipt of a first inbound signal, characterized by the first modulation frequency, at the second solar panel during the first test period in Block S122; detecting a second membership of the third solar panel in the second solar string, distinct from the first solar string, based on absence of receipt of the first inbound signal at the third solar panel during the first test period in Block S122; and interpreting a configuration of the set of solar panels in the solar array located on the structure based on the first membership and the second membership in Block S154.

1.3 Variation: Solar Devices+Solar String Membership

Another variation of the method S100 includes: triggering solar devices, in a set of solar devices arranged in a set of solar strings in a solar array installed on a structure, to output a fixed direct-current voltage in a test mode in Block S102, the set of solar devices including a first solar device (e.g., a first power regulator module), a second solar device, a third solar device, and a fourth solar device; triggering the first solar device to output a first alternating test signal at a first modulation frequency during a first test period in Block S114; and identifying a first solar string, in the set of solar strings, containing the first solar device and the second solar device and excluding the third solar device in response to a) receipt of a first inbound signal, characterized by the first modulation frequency, at the second solar device during the first test period and b) absence of receipt of the first inbound signal at the third solar device during the first test period in Block S122.

This variation of the method S100 can further include, during a second time succeeding the first time, accessing power outputs of solar devices in the first solar string in Block S130. In response to the first solar device outputting a maximum power of all solar devices in the first solar string, the method S100 can include: accessing a first output voltage value of the first solar device in Block S132; and at the second solar device—based on the first membership of the first solar device and the second solar device in the first solar string—a) accessing the first output voltage value and b) biasing search for a maximum power point voltage at the second solar device proximal the first output voltage value in Block S134.

1.4 Variation: Solar Devices+Multiple Distinct Solar Strings

Yet another variation of the method S100 includes: triggering solar devices, in a set of solar devices arranged in a set of solar strings in a solar array installed on a structure, to output a fixed direct-current voltage in a test mode in Block S102, the set of solar devices including a first solar device, a second solar device, a third solar device, and a fourth solar device; triggering the first solar device to output a first alternating test signal at a first modulation frequency during a first test period in Block S114; and triggering the third solar device to output a second alternating test signal at a second modulation frequency during a second test period in Block S114.

This variation of the method S100 also includes identifying a first solar string, in the set of solar strings, containing the first solar device and the second solar device and excluding the third solar device and the fourth solar device in Block S122 in response to: receipt of a first inbound signal, characterized by the first modulation frequency, at the second solar device during the first test period; and absence of receipt of the first inbound signal at the third solar device and the fourth solar device during the first test period.

This variation of the method S100 further includes identifying a second solar string, in the set of solar strings, containing the third solar device and the fourth solar device and excluding the first solar device and the second solar device in Block S122 in response to: receipt of a second inbound signal, characterized by the second modulation frequency, at the fourth solar device during the second test period; and absence of receipt of the second inbound signal at the first solar device and the second solar device during the second test period.

This variation of the method S100 also includes generating a visual representation of solar devices in the set of solar strings in the solar array located on the structure in Block S146.

2. Applications

Generally, Blocks of the method S100 can be executed by a controller (e.g., a local controller or "hub" connected to or integrated into an inverter; a remote computer system in communication with the solar array) and a set of solar panels arranged in the solar strings within a solar array installed on a structure (e.g., a roof): to coordinate output of voltage or power "ripples" at particular modulation frequencies from these solar panels (or their power regulator modules specifically); to detect presence or absence of signal components at these modulation frequencies at output terminals of these solar panels; and to identify membership of groups of solar panels in particular solar strings based on presence or absence of signal components at these modulation frequencies in signals detected at these solar panels.

The controller can further interface with the set of solar panels: to detect or interpret an order of solar panels within each solar string, such as based on voltage-to-ground values detected by solar panels in one solar string and/or based on propagation characteristics of wireless signals transmitted between solar panels within the solar string (e.g., via received signal strength indicator, round-trip time, and/or multi-carrier phase difference techniques); to estimate relative positions of solar strings on the structure, such as based on propagation characteristics of wireless signals transmitted between solar panels in different solar strings and known sizes of or pitch offsets between installed solar panels; and to assemble these solar string memberships, intra-solar string solar panel orders, and relative solar string positions into a virtual map of the solar array, including unique identification of each solar panel, its location, its solar string, and its wired connection to other solar panels and the inverter. Therefore, the controller can interface with the solar panels and/or the inverter to automatically fuse characteristics of wired communications between solar panels, characteristics of wireless communications between solar panels, and solar panel-to-ground contexts to automatically map relative positions of all solar panels in the solar array, including how these solar panels are wired in parallel or in series to their neighbors.

For example, the computer system can: present this virtual map to an installer during or soon after installation of the solar array to enable the installer to verify installation of the solar array; automatically detect and present installation errors (e.g., incorrect solar panel count in a solar string) directly on the virtual map in order to streamline error correction by the installer; and/or correctly annotate representations of solar panels in the virtual map with live performance data (e.g., voltage output, power output, duty cycle) of corresponding solar panels, thereby enabling the installer or other user to accurately monitor performance of the solar array. Therefore, the computer system can generate and leverage this virtual map of the solar array to streamline installation, troubleshooting, and monitoring of the solar array.

Additionally or alternatively, the controller can load solar string membership data onto the inverter, which can leverage these solar string membership data: to detect a particular solar panel underperforming relative to its peers in the same solar string; to flag the particular solar panel for cleaning or repair; and selectively issue commands to other solar panels in the same solar string to compensate for underperformance of the particular solar panel. In this example, the controller can also indicate the particular solar panel in the virtual map, and a service technician or other user can reference the virtual map to immediately and accurately identify the particular solar panel on the structure without further testing and or guessing. Therefore, the inverter can leverage solar string membership data to automatically trigger solar panels to compensate for performance of other solar panels in their solar strings; and the computer system can generate and leverage the virtual map of the solar array to streamline repair of the solar array.

Furthermore, during operation, solar panels within one solar string (or the inverter, the controller) can leverage solar string membership data: to identify a particular solar panel exhibiting greatest performance (e.g., greatest power output) in the solar string; identify an output voltage of the particular solar panel; and distribute this output voltage as a reference voltage to other (less-performant) solar panels in the solar string. Because solar panels in one solar string are physically collocated (e.g., installed next to one another on one common roof section), these solar panels may be similarly illuminated at any given time. Therefore, these other solar panels can bias their maximum power point tracking searches around this reference voltage, thereby reducing the maximum power point tracking search space, decreasing time spent outside of a maximum power point condition, and increasing total power output of these solar panels over time. Solar panels in this solar string can repeat this process over time (e.g., one per minute) to coordinate maximum power point tracking across the solar string as illumination of these solar panels changes. Therefore, solar panels in the solar array can leverage solar string membership data to coordinate maximum power point tracking, improve total power output of each solar panel over time, and thus increase total efficiency of the solar array.

2.2 Voltage Ripple for Solar String Membership Detection

In particular, the controller can: coordinate output of a voltage ripple—at a particular modulation frequency (e.g., 50 Hz)—by a first solar panel in the solar array during a first test period; and trigger all other solar panels in the solar array to output a fixed direct-current voltage and to record voltage and/or current timeseries across their output terminals during this first test period. For example, the controller can trigger these power regulator modules to output the same (or "common," target) direct-current voltage (e.g., 1.0 Volt DC). Alternatively, the controller can trigger each power regulator module: to record its current output voltage (e.g., its current maximum power point voltage); and to maintain (or "hold") this current output voltage throughout the duration of the first test period (and thus pause all maximum power point tracking techniques.

These solar panels can then generate spectral feature reports based on these voltage and/or current timeseries and report (e.g., wirelessly transmit) these spectral feature reports back to the controller. The controller can then: implement filtering, debouncing, Fourier analysis, and/or other signal processing techniques to detect a signal component at the modulation frequency (and greater than a threshold amplitude) in a particular subset of these spectral feature reports; identify a particular subset of solar panels that reported this particular subset of these spectral feature reports; and associate membership of this particular subset of solar panels and the first solar panel in a single solar string of the solar array (or otherwise associate this particular subset of solar panels and the first solar panel with a common solar string in the solar array). The controller can repeat this process for other solar panels in the array to detect and associate membership of other groups of solar panels in the solar strings within the solar array.

2.3 Disclaimers

The method S100 is described herein as executed by a local controller (e.g., adjacent or integrated into the inverter) in communication with each discrete power regulator module—each connected to one solar panel—in the solar array. However, the local controller can communicate more generally with solar panels in the solar array or with power regulator modules specifically integrated directly into solar panels.

Furthermore, the method S100 is described herein as executed in cooperation with multiple solar panels connected in series to form a set of solar strings, wherein all solar strings in the set are connected in parallel to one common solar inverter, in order to automatically detect solar string membership of each solar panel. Alternatively, the method S100 can be executed in cooperation with multiple solar panels connected in series to form a set of solar strings, wherein each solar string is connected in a string-specific micro-inverter, in order to automatically detect solar string membership of each solar panel.

Furthermore, the method S100 is described herein as executed in cooperation with power regulator modules in conventional-buck configurations in which increasing duty cycle increases output voltage. However, the method S100 can additionally or alternatively be executed in cooperation with power regulator modules in inverted-buck configurations in which decreasing duty cycle increases output voltage.

Furthermore, the method S100 is described herein as executed in cooperation with power regulator modules in to trigger one power regulator module to output an alternating voltage while all other power regulator modules in the solar array maintain fixed direct-current output voltages. However, the method S100 can additionally or alternatively be implemented to trigger one power regulator module to output an alternating current while all other power regulator modules in the solar array maintain fixed direct-current output currents.

Furthermore, the method S100 is described herein as executed in cooperation with power regulator modules configured to wirelessly communicate directly with other power regulator modules, such as via wired or short-range wireless communication protocols. However, the power regulator modules can communicate with other power regulator modules in the solar array via the controller, such as via wired or wireless communication protocols. Additionally or alternatively, the power regulator modules can transmit telemetry, status, or other data to the controller, and the controller can transform these data into general or power regulator module-specific commands and distribute these commands to power regulator modules in the solar array accordingly, such as via wired or wireless communication protocols.

3. Terms

Generally, a solar substring herein refers to a subdivision of a solar panel, such as a segment of solar cells arranged in series within one solar panel housing.

Generally, a solar panel herein refers to an assembly containing one or more solar cells (e.g., arranged in solar substring) arranged in a discrete housing.

Generally, a power regulator module herein refers to a power electronics device installed on, installed near, or integrated into a solar panel and configured to control output voltage and/or output power of the solar panel.

Generally, a solar string herein refers to a series-connected group of solar panels whose voltages sum. Solar strings are connected to an inverter, such as in parallel or independently.

Generally, solar array herein refers to an entire solar installation on a structure (e.g., a roof of a commercial or residential building, a solar panel support structure on a solar farm), including multiple solar strings, each containing one or more solar panels.

Generally, modulation frequency herein refers to a signal frequency assigned to a solar panel (e.g., a regulator module specifically) and characteristic of a power ripple output by the solar panel during a string identification period.

4. Power Regulator Module

Figure 5:
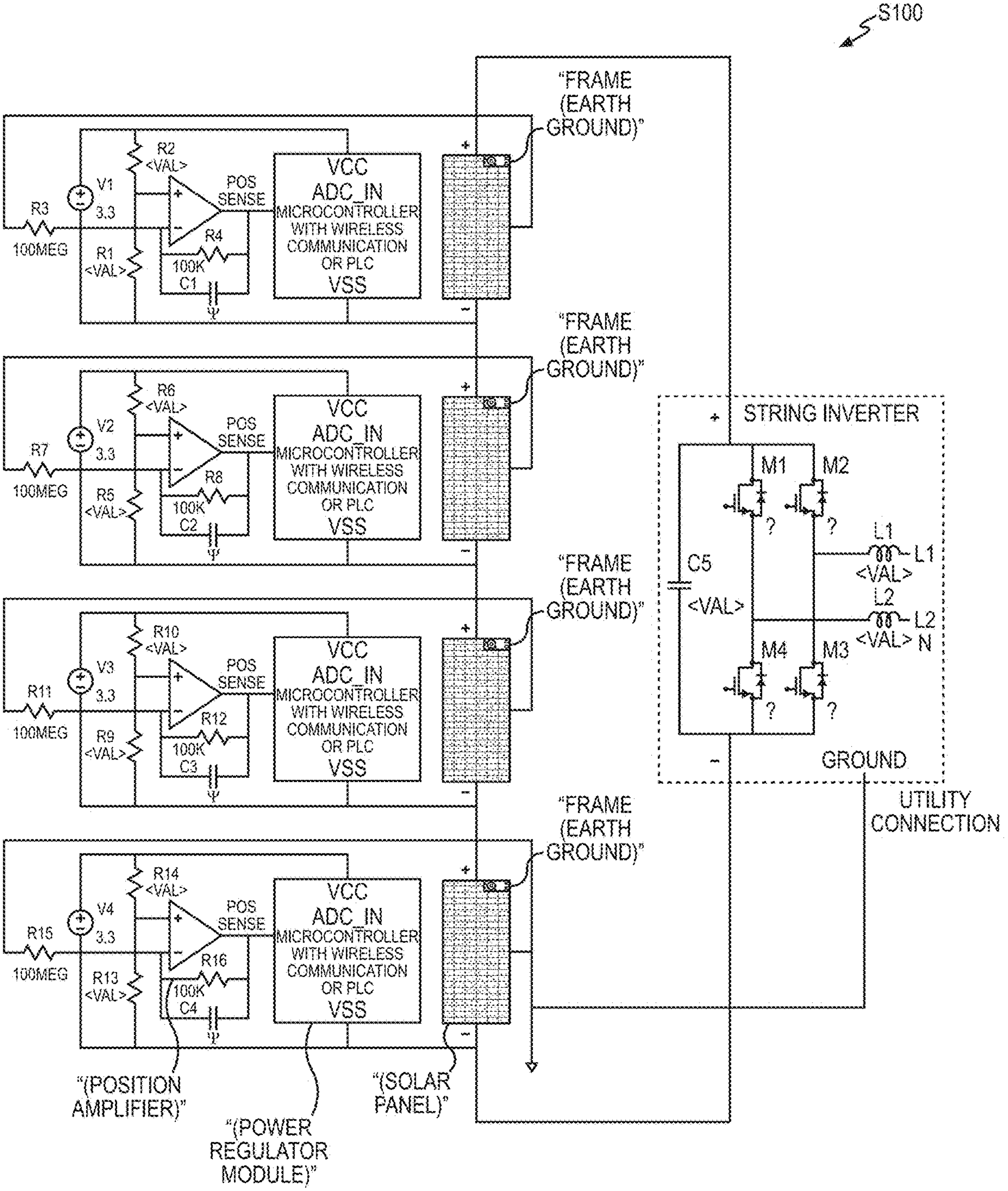
FIG. 5 is a schematic representation of a solar array.

As shown in FIG. 5, each solar panel can include or can be coupled to a power regulator module.

Generally, a power regulator module can: balance output voltage across solar cells within the solar panel to a nominal output voltage; and adjust (e.g., buck, boost) this nominal output voltage to a target output voltage (e.g., a maximum power point voltage).

In one implementation, a power regulator module defines a self-contained device configured to install on an individual solar panel, such as to a rear face of the solar panel. In this implementation, the power regulator module can include: an enclosure (e.g., polycarbonate, aluminum) configured to install on the rear side of the solar panel, such as via fasteners and/or adhesives; a power regulator module circuit (e.g., printed circuit board) arranged within the enclosure; and a power regulator module arranged within the enclosure and configured to trigger operation of the power regulator module circuit according to received communication data (e.g., duty cycles, maximum output voltage, telemetry data) from other power regulator modules in the solar array. Additionally, the power regulator module circuit defines: a set of input terminals (e.g., multi-contact 4-millimeter input jack, Amphenol H4 input jack) accessible from the enclosure and configured to connect (e.g., via wiring, direct soldering) to output terminals of a solar panel; and a set of output terminals (e.g., multi-contact 4-millimeter output jack, Amphenol H4 output jack) accessible from the enclosure and configured to connect (e.g., via wiring) to additional power regulator modules, a solar inverter, or a string inverter.

Alternatively, the power regulator module can be integrated into the solar panel and can be wired directly to power levels (e.g., individual solar cells, solar substrings) within the solar panel.

The power regulator module can also include a wireless communication module configured: to transmit operational data (e.g., duty cycle, maximum power point voltage, telemetry) of the power regulator module and/or its corresponding solar panel to the controller, the solar inverter, and/or other power regulator modules; to receive operational data from the elements of the system; to broadcast test packets during a string identification period; and/or to receive test packets broadcast by other solar panel during a string identification period.

The power regulator module can also include a signal processing circuit: electrically coupled to output terminals of the power regulator module; and configured to detect and interpret ripples in voltages across these output terminals resulting from output of test signals by other power regulator modules connected to the power regulator module.

4.1 Power Regulator Module Operation

As shown in FIG. 5 and described in U.S. patent application Ser. No. 18/610,983, filed on 20 Mar. 2024 and which is incorporated herein by reference, a power regulator module can include: a power supply (e.g., a switch-mode power supply) connected to a set of solar cells (e.g., a solar substring) within one solar panel and configured to receive an input voltage generated by the set of solar cells; and a modulation signal generator coupled to a gain control of the power supply and configured to modulate a voltage gain of the input voltage received at the power supply.

During operation of the solar array, the set of solar cells produces an input voltage that is received at an input terminal of the power supply. The power regulator module can then adjust a gain control of the power supply (e.g., via duty-cycle adjustment) to regulate a voltage or power output of the power regulator module to a load connected to the power regulator module.

The power regulator module can also generate a power signal based on a voltage output and a current output from the power supply. The power regulator module can trigger the modulation signal generator to generate a modulation signal characterized by a particular phase and frequency to modulate the gain control of the power supply and thus control the input voltage at the power supply. The gain control of the power supply can, therefore, remain in alignment with the phase and frequency of the modulation signal during operation of the power regulator module (i.e., when the modulation signal increases in amplitude, the voltage gain is increased, and when the modulation signal decreases in amplitude, the voltage gain is decreased).

The power regulator module can then generate a power signal based on the output voltage and current of the power supply as modulated by the modulation signal. During operation of the power regulator module, the power signal output by the power supply can fluctuate (i.e., increase and decrease in amplitude) as the gain control of the power supply is modulated by the modulation signal. The power regulator module can de-modulate this power signal and detect a deviation of the input voltage from a maximum power point voltage based on the DC component of the de-modulated signal, and apply a corrective voltage gain step toward the maximum power point voltage.

In one variation, the power regulator module can apply a band-pass filter to the power signal output by the power supply in order to reduce unwanted noise generated by the power supply. For example, the band-pass filter can define: a high-pass cutoff frequency greater than the frequency of the modulation signal; and a low-pass cutoff frequency less than the frequency of the modulation signal and configured to block a DC component of the power signal.

4.2 De-Modulator: Extracting Direct-Current Signals

Generally, the power regulator module can further include a de-modulator connected to the modulation signal generator and the power supply and configured to generate a de-modulated signal. The power regulator module can input the power signal output from the power supply and the modulation signal output from the modulation signal generator through the de-modulator to then output a de-modulated signal representing a correlation between the power signal and the modulation signal.

In one variation, the de-modulator includes a multiplier circuit configured to apply a product operation to the power signal and the modulation signal to then generate the de-modulated signal. In this variation, the power regulator module can also include a low-pass filter: connected to the de-modulator; defining a cut-off frequency less than the frequency of the modulation signal; and configured to block an AC component of the de-modulated signal. The power regulator module can then leverage a DC component output by the low-pass filter to interpret a voltage power-point condition for the input voltage. During operation of the power regulator module, the DC component of the de-modulated signal output from the de-modulator will be approximately zero when the input voltage is operating at the maximum power point voltage. Thus, the power regulator module can interpret a voltage power-point condition for the input voltage as deviating from the maximum power point voltage in response to observing a non-zero DC component of the de-modulated signal output from the de-modulator.

4.3 Integrator: Modifying Duty Cycle

The power regulator module can further include: an integrator connected to the de-modulator and the adder and configured to define a voltage-gain step for the input voltage at the power supply based on the de-modulated signal; and an adder connected to the integrator and the gain control of the power supply and configured to adjust the input voltage based on the voltage-gain step output by the integrator.

During operation, the integrator can receive the de-modulated signal output by the de-modulator and apply an integration operation to the de-modulated signal during a power cycle. The power regulator module can then define a corrective voltage-gain step based on the polarity and magnitude of the DC component of the de-modulated signal: to increase the input voltage in response to the input voltage falling below the maximum power point voltage; or to decrease the input voltage in response to the input voltage rising above the maximum power point voltage. The power regulator module can then apply the voltage-gain step defined by the integrator to the gain control of the power supply via the adder to adjust the input voltage toward the maximum power point voltage.

Thus, during operation, the power regulator module can execute multiple power cycles to iteratively adjust the input voltage until the maximum power point voltage is achieved and the power regulator module is operating at maximum power output.

5. Solar Array

Generally, the solar array can include a set of solar panels, each installed on a structure (e.g., one or more roof surfaces of a residential or commercial building) and including or connected to a power regulator module. These power regulator modules can be grouped into solar strings, wherein each power regulator module in a group is connected (i.e., wired) in series, and wherein these solar strings are connected (i.e., wired) in parallel to a common solar inverter.

In this implementation, the controller can define an external device configured to execute Blocks of the method S100 and arranged on or near the solar inverter. Alternatively, the controller can be integrated into the solar inverter or manifest in a remote computer system (e.g., a remote server, a computer network).

Alternatively, each solar string can be connected (i.e., wired) to one string inverter (or "micro-inverter"), and each string inverter can be connected (i.e., wired) to the structure or shore power. In this implementation, the controller can define an external device configured to execute Blocks of the method S100 and arranged on or near the solar array. Alternatively, the controller can be distributed across the set of string inverters or manifest in a remote computer system (e.g., a remote server, a computer network).

6. String Identification

The method S100 includes: triggering solar panels, in a set of solar panels arranged in a set of solar strings in a solar array installed on a structure and connected to an inverter, to output a fixed direct-current voltage in an test mode; triggering the first solar panel to output a first alternating test signal at a first modulation frequency during a first test period; detecting a first membership of the first solar panel and the second solar panel in the first solar string based on receipt of a first inbound signal, characterized by the first modulation frequency, at the second solar panel during the first test period; detecting a second membership of the third solar panel in the second solar string, distinct from the first solar string, based on absence of receipt of the first inbound signal at the third solar panel during the first test period; and interpreting a configuration of the set of solar panels in the solar array located on the structure based on the first membership and the second membership.

Generally, the controller can: trigger a first power regulator module in the solar array to output test signals (e.g., low peak-to-peak-voltage "ripples") at particular modulation frequencies while (all) other power regulator modules in the solar array output a fixed direct-current voltage in a test mode; identify a group of interconnected power regulators modules—including the first power regulator module—that forms one solar string in the solar array based on detection of this test signal at their output terminals; and repeat this process for other power regulator modules in the solar array in order to identify every solar string in the solar array and the specific power regulator modules wired in series within each solar string.

6.1 Solar Panel List

In one implementation, following installation of the set of solar panels and power regulator modules on the structure, connection of the solar panels and power regulator modules to form solar strings, and connection of the solar strings to the solar inverter by an installer, the controller can initialize a string identification cycle. During the string identification cycle, the controller can wirelessly broadcast a query to report power regulator module identifiers; receive a set of responses from a population of power regulator modules, proximal the controller, responsive to this query; and assemble a list of unique power regulator module identifiers—that may be incorporated in the solar array—based on these responses. For example, upon receipt of this query, each power regulator module can return a unique identifier—stored in local memory—to the controller. The controller can also: estimate distances between these power regulator modules and the controller based on signal strengths of responses to the query received from these power regulator modules; identifying a set of power regulator modules within a threshold distance of the controller and thus most likely within the solar array; and generate or revise the list of unique power regulator module identifiers to include only identifiers of power regulator modules that fall within the threshold distance of the controller or otherwise are associated with response signal strengths that indicate proximity to the controller.

Therefore, the controller can automatically identify power regulator modules (likely) in the solar array.

Additionally or alternatively, the controller can access a list of power regulator module identifiers assembled by the installer, such as by manually scanning barcodes on power regulator modules or by manually entering serial numbers of these power regulator modules during installation.

The controller can then generate a schedule for triggering power regulator modules in the solar array to output test signals during the string identification cycle, such as all power regulator modules sequentially, a subset of power regulator modules sequentially, or subsets of power regulator modules in parallel, as described below.

6.2 String Membership: Modulated Power Output

Upon identifying each power regulator module in the solar array, the controller can wirelessly broadcast a command to enter a test mode to all power regulator modules in the solar array. In the test mode, each power regulator module can operate at a fixed duty cycle (e.g., 1%) or otherwise output a fixed direct-current voltage (e.g., a constant 1.0 Volt DC). More specifically, the controller can trigger each power regulator module to output a fixed voltage such that the total voltage output by each solar string in the inverter reaches a minimum input voltage of the inverter, thereby enabling these power regulator modules to detect modulations across their output terminals when another power regulator module in the solar array is triggered by the controller to output a modulated signal. For example, the controller can trigger these power regulator modules to output the same (or "common," target) direct-current voltage (e.g., 1.0 Volt DC). Alternatively, the controller can trigger each power regulator module: to record its current output voltage (e.g., its current maximum power point voltage); and to maintain (or "hold") this current output voltage throughout the duration of the first test period (and thus pause all maximum power point tracking techniques.

In this implementation, the controller can then: select a first power regulator module in the solar array; assign a first test period (e.g., a first test start time and a test duration, such as five seconds) to the first power regulator module; retrieve or otherwise assign a nominal modulation frequency (e.g., 50 Hz) to the first power regulator module; select or otherwise assign a modulation signal shape (or a sinusoidal, square, sawtooth signal profile) to the first power regulator module; set or otherwise assign a test output center voltage to the first power regulator module, such as the same fixed direct-current voltage output by all other power regulator modules during this test period, a current maximum power point tracking voltage of the first power regulator module, or another target direct-current voltage (e.g., 1.0 Volt DC); and set or otherwise assign a test output alternating voltage to the first power regulator module, such as a peak-to-peak voltage equal to 10% of the test output center voltage assigned to the first power regulator module during this test period. The controller then: wirelessly broadcasts a command to output an alternating signal at the modulation frequency, centered around the test output center voltage (or at around an output voltage corresponding to the nominal duty cycle), characterized by a peak-to-peak voltage according to the test output alternating voltage, and approximating the modulation signal shape over the first test period to the first power regulator module; and wirelessly broadcasts commands to other power regulator modules in the solar array to record voltage timeseries across their output terminals during this first test period.

The first power regulator module then: sources power from its corresponding solar panel; and modulates its duty cycle at the modulation frequency to reproduce an alternating test signal during this first test period. Concurrently, each other power regulator module records a voltage and/or current timeseries across its output terminals.

In one implementation, these power regulator modules return their voltage and/or current timeseries to the controller (e.g., via wireless communication protocol), and the controller implements filtering, debouncing, Fourier analysis, and/or other signal processing techniques to search each voltage timeseries for a signal component: at or near the modulation frequency; and/or exhibiting an amplitude greater than a threshold amplitude that indicates direct wired connectivity between power regulator modules. The controller then: assembles a list of power regulator modules (e.g., power regulator module identifiers) that returned voltage timeseries that included such signal components; associates these power regulator modules with the first power regulator module; and assigns a first solar string identifier of a first solar string in the solar array to these power regulator modules and the first power regulator module. The controller can also record absence of a power regulator module from the first solar string responsive to absence of this signal component in a voltage timeseries received from this power regulator module.

Alternatively, the controller can transmit the modulation frequency to other power regulator modules in the solar array. Each power regulator module can thus: capture a voltage timeseries across its output terminals during the first test period; locally implement filtering, debouncing, Fourier analysis, and/or other signal processing techniques to search this voltage timeseries for a signal component at or near the modulation frequency and/or exhibiting an amplitude greater than the threshold amplitude; and return confirmation of presence or absence of this signal component to the controller. The controller can then: assemble a list of power regulator modules (e.g., power regulator module identifiers) that returned confirmation of this signal component; associate these power regulator modules with the first power regulator module; and assign a first solar string identifier of a first solar string in the solar array to these power regulator modules and the first power regulator module. The controller can also record absence of a power regulator module from the first solar string responsive to confirmation of absence of this signal component from this power regulator module.

The computer system can then repeat this process for each other power regulator module in the solar array to both: detect new groups of interconnected power regulators modules and assign new solar string identifiers of new solar strings to these new groups of power regulator modules; and to verify or reinforce groups of interconnected power regulators detected during prior test periods during this string identification cycle. For example, a particular power regulator module should only exist within one solar string and, therefore, should detect signal components characterized by the modulation frequency only during test periods in which other power regulator modules in the same solar string output modulation signals. Thus, if the controller detects the presence of a particular power regulator module in two groups, the computer system can: increase the threshold amplitude and restart the string identification cycle; and/or prompt the installer to manually confirm that the solar string contains the particular power regulator module.

Alternatively, the controller can: maintain a list of power regulator modules not yet grouped into a solar string; and sequentially execute the foregoing method (i.e., triggering output of a modulation signal and detection of corresponding signal components at output terminals of other power regulator modules in the solar array) only at power regulator modules remaining on this list in order to reduce total count of test periods and total duration of the string identification cycle.

Therefore, the controller can dynamically identify and organize power regulator modules into coherent groups corresponding to their physical and electrical relationships within the solar array.

6.3 Amplitude Thresholding

Furthermore, because the modulation signal output by the first power regulator module during the first test period may bleed into other solar strings in the solar array or otherwise may be detected—at lower amplitudes—at power regulator modules outside of the first solar string, the controller (or power regulator modules) can implement thresholding techniques to isolate frequency-matched signal components (i.e., signal components characterized by the modulation frequency) recorded by power regulator modules in the same solar string from frequency-matched signal components recorded by power regulator modules in other solar strings.

In one example, during the string identification cycle, the controller: generates a first command to output a first alternating test signal alternating at the first modulation frequency around the first test voltage; and wirelessly transmits the first command to the first solar panel that includes a first housing; a first solar substring arranged in the first housing; a first set of output terminals; and a first power regulator coupled to the first solar substring and arranged on the first housing.

The controller also: generates a second command to output the fixed direct-current voltage (e.g., 1.0 Volt DC) during a first test period; and wirelessly transmits the second command to a second solar panel that includes a second housing, a second solar substring arranged in the second housing, a second set of output terminals, and a second power regulator coupled to the second solar substring and arranged on the second housing.

In response to receipt of the first command, the first power regulator module modulates a first duty cycle of the first solar panel during the first test period: to drive a direct-current voltage approximating the first test voltage across the first set of output terminals; and to drive an alternating-current voltage at the first modulation frequency across the first set of output terminals.

In response to receipt of the second command, the second power regulator: clamps a second voltage across the second set of output terminals to the fixed direct-current voltage (or otherwise maintains (or "holds") its current output voltage) and detects a first inbound frequency of an oscillating signal component of a first inbound signal at the second set of output terminals during the first test period; and wirelessly transmits the first inbound frequency to the controller.

Later, the controller detects membership of the first solar panel and the second solar panel in a first solar string in response to the first inbound frequency approximating the first modulation frequency.

In particular, in this example, the controller and/or the second power regulator module can: derive a first signal amplitude of the oscillating signal component of the first inbound signal detected across output terminals of the second power regulator module; and detect membership of the first solar panel and the second solar panel in the first solar string in response to both the first signal amplitude exceeding a threshold signal amplitude and the first inbound frequency of this oscillating signal component approximating the first modulation frequency.

Conversely, the controller and/or a third power regulator module can: derive a second signal amplitude of an oscillating signal component of a second inbound signal detected across output terminals of the third power regulator module during the first test period; and detect membership of the third power regulator module in a second, different solar string in response to at least one of a) the second signal amplitude falling below the threshold signal amplitude and b) an inbound frequency of this oscillating signal component differing from the first modulation frequency by more than a threshold difference.

As described above, a particular power regulator module should only exist within one solar string and, therefore, should detect signal components characterized by the modulation frequency only during test periods in which other power regulator modules in the same solar string output modulation signals. Thus, if the controller detects presence of a particular power regulator module in two groups, the computer system can: increase the threshold amplitude; and restart the string identification cycle or reevaluate solar string membership based on this revised threshold amplitude. Conversely, each power regulator module should exist in one solar string. Thus, if the controller detects absence of a particular power regulator module in at least one solar string, the computer system can: decrease the threshold amplitude; and restart the string identification cycle or reevaluate solar string membership based on this revised threshold amplitude.

6.4 Single-Panel Serial Output Modulation+Rapid Shutdown Verification

As described above, the controller can sequentially trigger individual power regulator modules to transition out of the test mode to output voltage ripples at known modulation frequencies during discrete (i.e., non-overlapping) test periods. Accordingly, the controller can trigger these power regulator modules to output modulation signals of the same or similar characteristics (e.g., modulation frequency, center voltage, test period duration).

In one variation, the controller can also: trigger a power regulator module to execute rapid shutdown following completion of a test period; and verify rapid shutdown functionality of the power regulator module. In particular, the controller can: implement methods and techniques described above to select a first power regulator module, wirelessly transmit a command to output a modulation signal with specific characteristics during a first test period, and wirelessly transmit commands to other power regulator modules to "listen" for corresponding ripples across their output terminals during the first test period; wirelessly transmit a command to the first power regulator module to rapidly return to a quiescent voltage (e.g., a null voltage or 0 Volts, such as by reducing duty cycle to zero-percent) upon conclusion of the first test period; and wirelessly transmit commands to other power regulator modules to listen for persistent voltage (or ripples) across their output terminals following the first test period. Accordingly, after the first test period, the power regulator modules can report presence or absence of persistent voltage across their output terminals within a time window following the first test period. The controller can: verify rapid shutdown of the first power regulator module if no other power regulator module reports persistent voltage across its output terminal within the time window; or flag the first power regulator module for improper shutdown—and prompt the installer to correct or replace the first power regulator module—if any power regulator module in the array (or in the same solar string specifically) reports persistent voltage across its output terminal within this time window.

For example, the controller can: trigger the first power regulator module to transition to a shutdown mode during a first shutdown test period following the first test period, wherein the first power regulator module outputs the quiescent voltage in the shutdown mode. Then, based on the first membership of the first power regulator module and a second power regulator module in a first solar string, the controller can confirm shutdown operation of the first power regulator module in response to absence of detection of a signal, above the quiescent voltage, at the second power regulator module during the first shutdown test period. Conversely, in response to detection of a signal above the quiescent voltage at the second power regulator module during the first shutdown test period, the controller can: detect improper shutdown of the first power regulator module based on the first membership; generate a notification including a prompt to investigate the first power regulator module for improper shutdown and indicating a location of the first power regulator module based on the configuration of the set of power regulator modules (as described below); and serve the notification to an operator (e.g., by transmitting the notification to a mobile device carried by the installer).

6.5 Multi-Panel Parallel Output Modulation

Conversely, the controller can trigger multiple power regulator modules to simultaneously output different (i.e., distinct, distinguishable) modulation signals during one test period. The controller and/or the power regulator modules can then implement Fourier analysis and/or other signal processing techniques to detect presence or confirm absence of corresponding signal components in voltages read across output terminals of these power regulator modules during this single test period. By testing connectivity of multiple power regulator modules in the solar array via concurrent output of modulation signals, the controller can reduce the total duration of the string identification period.

Accordingly, in this variation, the controller can: select a subset of power regulator modules (e.g., two power regulator modules, 20% of power regulator modules in the solar array, all power regulator modules in the solar array); set different modulation signal characteristics for each power regulator module in this subset, such as by pseudorandomly assigning a unique modulation frequency and shape—from a predefined set of modulation frequencies and shapes—to each power regulator module in this set; distribute these modulation signal characteristics to their corresponding power regulator modules; and trigger these power regulator modules to concurrently output their modulation signals according to their assigned characteristics while also "listening" for modulation signals from other power regulator modules on their output terminals. The controller and/or the power regulator modules can then implement methods and techniques described above to detect solar string membership of power regulator modules based on identifiers of power regulator modules assigned to each unique combination of modulation frequency and shape.

For example, the controller can: detect a first signal component, characterized by a first modulation frequency assigned to a first power regulator module, in a first inbound signal detected by a second power regulator module during a first test period; and interpret membership of the first power regulator module and the second power regulator module in a first solar string based on presence of the first signal component, characterized by the first modulation frequency, in a second inbound signal detected at the second power regulator module; detect a second signal component, characterized by a second modulation frequency different from the first modulation frequency and assigned to a third power regulator module during the first test period, in the first inbound signal detected by the second power regulator module during the first test period; and interpret membership of the third power regulator module in the first solar string based on presence of the second signal component, characterized by the second modulation frequency, in the first inbound signal.

6.6 External Solar Panel Rejection

In another implementation, the controller can remove a particular power regulator module from the solar panel list (e.g., a solar panel list generated automatically based on responses to a query broadcast wirelessly by the controller) in response to failure of all power regulator modules in the solar array to detect a signal component—at their output terminals—matched to characteristics of the modulation signal output by the particular power regulator module. For example, if the solar array is installed on a roof of a single-family dwelling near a second single-family dwelling with a second solar array, a power regulator module in the second solar array may report an identifier to the controller responsive to a query broadcast by the controller, and the controller can include this identifier on the solar panel list. However, because the second power regulator module is not connected to the solar array, no modulation signal output by the second power regulator module will be detected by power regulator modules in the solar array. The controller can thus remove the second solar array from the solar panel list if no power regulator module in the solar array reports detection of signal components matched to the characteristics of the modulation assigned to the second power regulator module during the test period assigned to the second power regulator module.

For example and as described above, the controller can:

wirelessly broadcast a query prior to the string identification period; and receive a set of responses from a population of power regulator modules, proximal the controller, responsive to the query, the population of power regulator modules including the set of power regulator modules and a fourth power regulator module. The controller can then: trigger the second power regulator module to output a second alternating test signal at a second modulation frequency during a second test period distinct from the first test period assigned to the first power regulator module; and identify the second power regulator module as outside of the solar array in response to absence of receipt of an inbound signal—characterized by the second modulation frequency—at all power regulator modules in the set of power regulator modules during the second test period.

Therefore, the controller and power regulator modules can: support open wireless handshakes or pairing to handoff identifiers and modulation signal commands for string identification rather than require labor-intensive manual pairing; and automatically detect power regulator modules that may have wirelessly reported to the controller despite being physically decoupled from the solar array, thereby streamlining string identification for the solar array.

7. Panel Sequence Per Solar String

In one variation, the controller detects an order of power regulator modules connected in series within a solar string.

7.1 Module Sequencing Based on Modulation Signal Strength

In one variation, once the controller identifies a subset of power regulator modules within one solar string, the controller further interprets an order of these power regulator modules within the solar string based on amplitudes of modulation signal components output and detected by these power regulator modules during the string identification period.

In one implementation, the controller can: trigger a first power regulator module to output a modulation signal during a first test period; detect this modulation signal at a first amplitude greater than a threshold amplitude at a second power regulator module; detect this modulation signal at a second amplitude greater than the threshold amplitude but less than the first amplitude at a third power regulator module; and detect this modulation signal at a third amplitude less than the threshold amplitude and the second amplitude at a fourth power regulator module. Accordingly, the controller can: identify membership of the first, second, and third power regulator module in a first solar string; identify the first power regulator module as furthest from the inverter in the first solar string; identify the third power regulator module as nearest the inverter in the first solar string; identify the second power regulator module as between the first and third power regulator modules in the first solar string; and identify the fourth power regulator module as outside of the first solar string.

The controller can also: trigger the second power regulator module to output a modulation signal during a second test period; detect this modulation signal at a first amplitude greater than the threshold amplitude at the first power regulator module; detect this modulation signal at a second amplitude greater than the threshold amplitude and greater than or less than the first amplitude at the third power regulator module; and detect this modulation signal at a third amplitude less than the threshold amplitude at a fourth power regulator module. Accordingly, the controller can reinforce the solar string membership and string order previously interpreted based on the modulation signal presence and amplitude results.

In another example, the controller can: detect a first inbound signal, characterized by a first modulation frequency, at a first signal amplitude at a second power regulator module during a first test period; detect a second inbound signal, characterized by the first modulation frequency, at a second signal amplitude at a third power regulator module during the first test period; and detect membership of the first, second, and third power regulator modules in a first solar string in response to the first and second signal amplitudes exceeding the threshold signal amplitude. Furthermore, in response to the first signal amplitude exceeding the second signal amplitude, the controller can: predict a first distance between the first power regulator module and the second power regulator module in the first solar string; and predict a second distance—greater than the first distance—between the first power regulator module and the third power regulator module in the first solar string. The controller can repeat this process for all power regulator modules in the solar array and derive an order of power regulator modules in each solar string that resolves these amplitude-based relative distances or proximities between power regulator modules.

7.2 Module Sequencing Based on Voltage Gradient

Additionally or alternatively, the controller can interpret an order of power regulator modules within a solar string based on voltages between output terminals of these power regulator modules and ground.

In particular, each power regulator module (or solar panel more generally) can be connected (i.e., wired) to earth ground and can include a position amplifier configured to detect a voltage difference between a negative terminal on the power regulator module and earth ground. During the string identification period, the controller can trigger each power regulator module in a string to: output a small voltage (e.g., one volt, one-percent duty); detect its output voltage relative to earth ground; and report this voltage-to-ground value to the controller. Because these power regulator modules are connected in series within the solar string: a first power regulator module in the solar string further from the inverter may report a lowest voltage-to-ground value; a second power regulator module in the solar string downstream of the first power regulator module may report a greater voltage-to-ground value (i.e., a sum of the voltage outputs of the first and second power regulator modules); and a third power regulator module in the solar string may report an even greater voltage-to-ground value (i.e., a sum of the voltage outputs of the first, second, and third power regulator modules); etc.

Therefore, the controller can interpret an order of power regulator modules within the solar string based directly on voltage-to-ground values reported by these power regulator modules. In particular, the controller can derive a sequential arrangement of power regulator modules within a solar string based on ascending voltage-to-ground values detected by these power regulator modules when operating together at greater than the quiescent voltage.

8. Virtual Map

In one variation, the controller coordinates wireless broadcast of test signals between power regulator modules. The controller (or a remote computer system) then: aggregates propagation characteristics of these wireless test signals; and fuses these propagation characteristics with string memberships and/or string sequences derived from wired test signals collected during the string identification period to automatically generate a virtual map (e.g., an as-built map, a spatial representation) of the solar array, such as including relative positions and identifiers of each power regulator module and solar panel in the solar array.

More specifically, the controller (and/or the remote computer system) can compile propagation characteristics of both wireless and wired signals broadcast between power regulator modules, voltage-to-ground values detected by power regulator modules, and known geometries (e.g., lengths, widths) of solar panels to generate a virtual map, geometric model, or other graphical representation of relative positions of each solar panel, membership and order of each solar panel in a string, and identifiers of corresponding power regulator modules. The controller (or a remote computer system) can then: present this virtual map to the installer (e.g., via an installer portal executing on a mobile device) to enable the installer to rapidly verify installation of the solar array; and/or detect installation errors in the solar array, such as based on a difference between the virtual map and an installation plan for the solar array or installation specifications, and highlight these installation errors on the virtual map to enable the installer to rapidly identify and correct the solar array. Additionally or alternatively, the controller (or a remote computer system) can: retrieve real-time operational status data (e.g., real-time voltage output, power output, duty cycle); annotate a representation of each solar panel in the virtual map with its real-time operator status; and present this annotated virtual map to the installation, an operator, or other user to enable real-time monitoring of the solar array.

In one implementation, the controller: triggers solar panels, in the set of solar panels, to wirelessly broadcast test packets; accesses a set of propagation characteristics (e.g., round-trip time, phase difference, received signal strength) of test packets received by the set of solar panels; and calculates relative positions of the set of power regulator modules based on the set of propagation characteristics. For example, the controller can: load assumptions that groups of solar panels in the solar array are installed on a common plane (e.g., a flat or pitched roof) and that each power regulator module is attached on (the back of) its corresponding solar panel; retrieve dimensions of the solar panels; implement received signal strength indicator, round-trip time, and/or multi-carrier phase difference techniques to estimate pairwise distances between pairs of power regulator modules; implement trilateration techniques to transform these pairwise distances into relative three-dimensional position estimates of the power regulator modules; implement plane-fitting techniques to calculate one or more best fit planes proximal position estimates of groups of power regulator modules; collapse (e.g., shift along a vertical axis) each power regulator module position estimate onto its corresponding plane in order to reflect installation of solar panels onto flat or pitched roof structures; and laterally and longitudinally adjust each power regulator module position estimate within its plane to enforce lateral and longitudinal pitch offsets between power regulator modules that reflect at least minimum dimensions of the solar panels.

The controller can thus transform propagation characteristics of wireless test packets transmitted between solar panels into a three-dimensional map (or "virtual map") of relative positions of each power regulator module (or a wireless communication module or antenna specifically within each power regulator module).

The controller can then annotate the virtual map with representations of electrical interconnections between power regulator modules and/or solar panels. For example, the controller can: connect representations of power regulator modules within one solar string with icons (e.g., lines) representing serial wired interconnections between these power regulator modules based on the derived order of power regulator modules in this string; project a bounding box around representations of power regulator modules in this string in the virtual map; and annotate this bounding box with a solar string identifier in the virtual map.

8.1 Plan v. As-Built

In one variation, the remote computer system (or an installer portal executing on a computing device associated with the installer): accesses an installation plan—for the solar array—that represents both target positions of the set of solar panels; and target connectivity (i.e., wired connections) between the solar panels to form planned solar strings; detects a difference between the virtual map and the installation plan; annotates the virtual map according to (i.e., to highlight) the difference; and serves the virtual map to an installer, operator, or other users.

In one example, the remote computer system: accesses the virtual map of the solar array generated by the controller; and retrieves an installation plan for the solar array, such as a two-dimensional engineering plan or drawing of the solar array. The remote computer system then: implements edge detection, object recognition, or other computer vision techniques to detect representations of solar panels in the installation plan; adjusts positions of power regulator modules and/or solar panels—represented in the virtual map—to align with positions of nearest power regulator modules and/or solar panels detected in the installation plan; and adjusts wired interconnection and string membership icons (e.g., lines, bounding box, labels) in the virtual map to align with these repositioned power regulator module representations.

The remote computer system can then: flag any power regulator modules—represented in the virtual map—shifted by more than a threshold distance (e.g., one solar panel length, two solar panel widths) to align with a corresponding solar panel representation in the installation plan; and serve a prompt to the installer (e.g., via the installer portal executing on the installer's mobile device) to verify position and installation of these power regulator modules and corresponding solar panels.

Furthermore, the remote computer system can: implement edge detection, object recognition, or other computer vision techniques to detect representations of solar panel string membership and solar panel or power regulator module interconnections in the installation plan; detect differences between panel string membership and interconnects represented in the installation plan and the virtual map; and serve a prompt to the installer to verify connections between these solar panels or power regulator modules.

Therefore, the remote computer system can: compare both planned and as-built positions of and electrical interconnections between solar panels and/or power regulator modules in the solar array to detect position and interconnect differences between planned and as-built; flag these differences; and prompt the installer to verify or correct the solar array as-built.

8.2 Photographic Image Annotation

In a similar implementation, the controller (or the remote computer system) can: access a photographic image of the solar array, such as captured by a unmanned aerial vehicle or via a mobile device by the installer; implement similar methods and techniques to detect solar panels in the photographic image; align representations of power regulator modules and/or solar panels in the virtual map to solar panels detected in the photographic image; and project power regulator module identifiers, interconnections, and solar string memberships from the virtual map—now aligned to the photographic image—onto the photographic image, thereby annotating the photographic image of the say with accurate power regulator module or solar panel identifiers, interconnections, and solar string memberships.

The controller or the remote computer system can then present this annotated photographic image to the installer (or operator, etc.), such as in the form of a live augmented reality video feed or an as-built record of the solar array.

8.3 System Monitoring

As described above, the controller or the remote computer system can also: retrieve real-time operational status data (e.g., real-time voltage output, power output, duty cycle); annotate a representation of each solar panel in the virtual map with its real-time operator status; and present this annotated virtual map to the installation, an operator, or other user to enable real-time monitoring of the solar array.

In one implementation, during nominal operation of the solar array (i.e., following the string identification period), the remote computer system (or the controller): accesses an instantaneous power output (or voltage, duty cycle) from each power regulator in the solar array; annotates representations of each power regulator module in the virtual map with corresponding instantaneous power outputs (or voltages, duty cycles); and renders the visualization on a display of a computing device, such as accessed by the installer, an operator, or building owner.

Therefore, the controller and/or the remote computer system can: automatically generate an accurate representation of positions of, interconnections between, and solar string membership of power regulator modules in the solar array; compile real-time performance metrics of the power regulator modules; and annotate this representation of the solar array with correct, live performance metrics of each solar panel or power regulator module.

9. Live Installer Support

Additionally or alternatively, the controller (or the remote computer system) can detect installation errors in the solar array based on derived solar panel or power regulator module interconnections and solar string membership, such as without access to an installation plan or engineering drawing.

In one example, after interpreting string membership of the set of power regulator modules, the controller: detects a first count of power regulator modules in a first solar string in the solar array; detects a second count of power regulator modules in a second solar string in the solar array; etc. In response to the first count of power regulator modules exceeding the second count of power regulator modules, the controller: generates a notification including a prompt to investigate the first and/or second solar string for improper solar string length, such as to move a power regulator module from the first solar string to the second solar string; and serves the notification to the installer.

In a similar implementation, the controller can retrieve a target count of power regulator modules per solar string, such as in a specification or installation plan. In response to the first count of power regulator modules differing from this target count of power regulator modules or from a particular count of power regulator modules assigned to the first solar string, the controller can: generate a notification including a prompt to investigate the first solar string for improper solar string length; and serve the notification to the installer.

In the foregoing examples, the controller (or the remote computer system) can also: retrieve the virtual map of the solar array; highlight solar strings containing irregular power regulator module counts in the virtual map; and serve this annotated virtual map to the installer.

Therefore, the controller (or the remote computer system) can flag possible errors in the solar array based on solar string membership, thereby enabling the installer to rapidly identify and correct wiring errors before activating the solar array, connecting the solar array to shore power, or otherwise leaving the jobsite.

10. Coordinate Power Controls

Later, during operation and as shown in FIG. 4, the controller, power regulator modules, and/or inverter can leverage known solar string memberships and/or power regulator module interconnections to control operation of the solar array, such as to enable power regulator modules to converge on maximum power point voltages more efficiently, to avoid inverter drop-out or cycling, or coordinate rapid shutdown of a string or the entire solar array, etc.

In one implementation, during operation following the string identification period, the controller (or the inverter) can access a live power output and an output voltage of each power regulator module in a first solar string. In response to a first power regulator module in the first string outputting a maximum (or "peak") power compared to all power regulator modules in the first solar string, the controller can: set the first output voltage value of the first power regulator module as a regulator voltage value; and distribute this regulator voltage value to each other power regulator module in the first solar string. These other power regulator modules can then bias their searches for maximum power point voltage around this reference voltage value. In particular, because solar panels in one solar string may be installed in close proximity, they may be subject to similar illumination and may, therefore, exhibit similar maximum power point voltages at any given time. Therefore, the controller and/or these power regulator modules can leverage knowledge of solar string membership to share a voltage—currently yielding greatest power output within one power regulator module in the string—to all other power regulator modules within this solar string, thereby enabling these other power regulator modules: to jump their maximum power point searches to voltages that have been more effective elsewhere in the same string; to find their own maximum power point voltages in less time; and to thus operate at or near peak efficiency for a greater proportion of their operating periods.

In another implementation, the inverter, the controller, and/or these power regulator modules can leverage knowledge of solar string membership to increase output voltages of some power regulator modules within a string to compensate for loss of performance of another power regulator module in the same string, such as due to loss of illumination or a failure at this other power regulator module or corresponding solar panel. For example, the inverter can: assign a first target bus voltage to a first solar string in the solar array; and receive a first live output voltage of a first power regulator module in the first solar string, such as wirelessly reported by the first power regulator module. In response to this first live output voltage of the first power regulator module falling below the first target bus voltage by more than a threshold voltage and based on known membership of the first power regulator module and a second power regulator module in the first solar string, the inverter can: generate a command to increase voltage output to compensate for reduced output voltage of the first power regulator module; and serve this command to the second power regulator module, thereby prompting the second power regulator module to (temporarily) compensate for this drop in performance of the first power regulator module.

In a similar example, each power regulator module in a first solar string in the solar array can: report its live output voltages to other power regulator modules in the first solar string; and sum these output voltages to calculate a first live total string voltage of the first solar string. In response to this first live total string voltage approaching a minimum DC bus voltage of the inverter, these power regulator modules can increase their output voltages (e.g., by increasing their duty cycles)—even if this includes moving away from their maximum power point voltages—in order to avoid inverter drop-out or an undervoltage condition that may trigger shutdown of the first solar string or the inverter. Conversely, in response to this first live total string voltage approaching a maximum DC bus voltage of the inverter, these power regulator modules can decrease their output voltages (e.g., by decreasing their duty cycles) in order to avoid an overvoltage condition that may trigger shutdown of the inverter and the entire solar array.

In a similar example, when the first power regulator module in the first solar string detects a fault and initiates rapid shutdown, the first power regulator module can report this rapid shutdown action to other power regulator modules in the first solar string. These other power regulator modules can increase their output voltages in order to compensate for loss of voltage contribution from the first power regulator module, thereby avoiding inverter drop-out or an undervoltage condition that may trigger shutdown of the first solar string or the inverter.

However, the controller, the inverter, and the power regulator modules can implement any other method or technique to coordinate their power outputs in order to increase total efficiency of the solar array and/or avoid fault conditions that may cause shutdown of some or all power regulator modules in the solar array.

11.1 Solar Panel Failure

In another implementation shown in FIG. 4, during operation of the solar array, the controller (or the inverter, the remote computer system) can: access a first live (or "instantaneous") power output of a first power regulator module in a first solar string; and access a second live power output of a second power regulator module in the first solar string. In response to the first live power output of the first power regulator module differing from the second live power output of the second power regulator module, such as by more than a threshold voltage for more than a threshold duration, the controller can: predict a failure at the first power regulator module or corresponding solar panel; generate a notification including a prompt to investigate the first power regulator module for improper operation; augment the notification with a location of the first power regulator module in the solar array, such as by annotating a representation of the first power regulator module or corresponding solar panel in the virtual map; and then serve this notification to the installer, operator, or other user.

Therefore, the controller, the inverter, and/or the remote computer system can leverage known solar string memberships and locations: to compare performance of interconnected power regulator modules and solar panels that should receive similar illumination and thus exhibit similar performance over time; to flag performance differences between these power regulator modules and solar panels; and to guide an installer, operator, or other user toward rapidly identifying, investigating, servicing, and/or replacing defective power regulator modules and/or solar panels.

12. System Updates

Furthermore, the controller can execute the method S100 over time to verify or update recorded solar string memberships and power regulator module or solar panel locations.

For example, the controller can automatically execute the method S100 once per week, such as during low-illumination periods just before sunrise or after dusk. Alternatively, the controller can automatically execute the method S100 when triggered by an installer, operator, or other user, such as following replacement of any component of the solar array or following expansion of the solar array with additional power regulator modules, solar panels, and/or solar strings.

13. Conclusion

The controllers and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:

triggering solar panels, in a set of solar panels arranged in a set of solar strings in a solar array installed on a structure and connected to an inverter, to output a fixed direct-current voltage in a test mode, the set of solar strings comprising a first solar string and a second solar string, the set of solar panels comprising a first solar panel, a second solar panel, and a third solar panel;

triggering the first solar panel to output a first alternating test signal at a first modulation frequency during a first test period;

detecting a first membership of the first solar panel and the second solar panel in the first solar string based on receipt of a first inbound signal, characterized by the first modulation frequency, at the second solar panel during the first test period;

detecting a second membership of the third solar panel in the second solar string, distinct from the first solar string, based on absence of receipt of the first inbound signal at the third solar panel during the first test period; and interpreting a configuration of the set of solar panels in the solar array located on the structure based on the first membership and the second membership.

2. The method of claim 1, further comprising, during a second test period succeeding the first test period:

accessing power outputs of solar panels in the first solar string; and in response to the first solar panel outputting a maximum power of all solar panels in the first solar string:

accessing a first output voltage value of the first solar panel; and based on the first membership of the first solar panel and the second solar panel in the first solar string:

at the second solar panel:

accessing the first output voltage value; and biasing search for a maximum power point voltage at the second solar panel proximal the first output voltage value.

3. The method of claim 1, further comprising:

triggering solar panels, in the set of solar panels, to wirelessly broadcast test packets;

accessing a set of propagation characteristics of test packets received by the set of solar panels;

accessing a first voltage-to-ground value read by the first solar panel;

accessing a second voltage-to-ground value read by the second solar panel;

interpreting a first sequence of the first solar panel and the second solar panel in the first solar string based on a difference between the first voltage-to-ground value and the second voltage-to-ground value;

calculating a set of relative positions of the set of solar panels in the solar array based on the set of propagation characteristics;

generating a virtual map of the solar array comprising representations of the set of solar panels located according to the set of relative positions;

annotating the virtual map with a set of interconnection icons representing wired interconnections between solar panels in each solar string in the set of solar strings, the set of interconnection icons comprising a first interconnection icon representing wired interconnection between the first solar panel and the second solar panel based on the first sequence and the first membership; and annotating the virtual map with a set of bounding boxes encircling representations of groups of solar panels in each solar string in the set of solar strings, the set of bounding boxes comprising a first bounding box encircling the first solar panel and the second solar panel and identifying the first solar string based on the first membership.

4. The method of claim 1:

wherein triggering solar panels in the set of solar panels to output the fixed direct-current voltage in the test mode comprises, at a controller:

generating a second command to output the fixed direct-current voltage; and wirelessly transmitting the second command to the second solar panel, the second solar panel comprising:

a second housing;

a second solar substring arranged in the second housing;

a second set of output terminals; and a second power regulator coupled to the second solar substring and arranged on the second housing;

further comprising, at the second power regulator, in response to receipt of the second command:

during the first test period:

clamping a second voltage across the second set of output terminals to the fixed direct-current voltage; and detecting a first inbound frequency of an oscillating signal component of the first inbound signal at the second set of output terminals; and wirelessly transmitting the first inbound frequency to the controller;

wherein triggering the first solar panel to output the first alternating test signal at the first modulation frequency during the first test period comprises, at the controller:

generating a first command to output the first alternating test signal alternating at the first modulation frequency around the fixed direct-current voltage; and wirelessly transmitting the first command to the first solar panel, the first solar panel comprising:

a first housing;

a first solar substring arranged in the first housing;

a first set of output terminals; and a first power regulator coupled to the first solar substring and arranged on the first housing;

further comprising, at the first power regulator, in response to receipt of the first command:

during the first test period, modulating a first duty cycle of the first solar panel:

to drive a direct-current voltage approximating the fixed direct-current voltage across the first set of output terminals; and to drive an alternating-current voltage at the first modulation frequency across the first set of output terminals; and wherein detecting the first membership of the first solar panel and the second solar panel in the first solar string comprises detecting the first membership of the first solar panel and the second solar panel in the first solar string in response to the first inbound frequency approximating the first modulation frequency.

5. The method of claim 1:

wherein detecting the first membership of the first solar panel and the second solar panel in the first solar string comprises:

detecting the first inbound signal, characterized by the first modulation frequency, at a first signal amplitude at the second solar panel during the first test period; and detecting the first membership of the first solar panel and the second solar panel in the first solar string in response to the first signal amplitude exceeding a threshold signal amplitude; and wherein detecting the second membership of the third solar panel in the second solar string comprises:

detecting the first inbound signal, characterized by the first modulation frequency, at a second signal amplitude at the third solar panel during the first test period; and detecting membership of the third solar panel outside of the first solar substring in response to the second signal amplitude falling below the threshold signal amplitude.

6. The method of claim 5:

further comprising:

detecting the first inbound signal, characterized by the first modulation frequency, at a third signal amplitude at a fourth solar panel, in the set of solar panels, during the first test period;

in response to the third signal amplitude exceeding the threshold signal amplitude:

detecting a third membership of the fourth solar panel in the first solar string; and in response to the third signal amplitude exceeding the first signal amplitude:

predicting a first distance between the first solar panel and the second solar panel in the first solar string; and predicting a second distance between the first solar panel and the fourth solar panel in the first solar string, the second distance less than the first distance; and wherein interpreting the configuration of the set of solar panels in the solar array located on the structure comprises interpreting the configuration further based on the first distance and the second distance.

7. The method of claim 1:

wherein detecting the first membership of the first solar panel and the second solar panel in the first solar string comprises:

detecting a first signal component, characterized by the first modulation frequency, in the first inbound signal received by the second solar panel; and interpreting the first membership of the first solar panel and the second solar panel in the first solar string based on presence of the first signal component, characterized by the first modulation frequency, in the first inbound signal;

further comprising:

triggering a fourth solar panel, in the set of solar panels, to output a second signal at a second modulation frequency during the first test period, the second modulation frequency different from the first modulation frequency;

detecting a second signal component, characterized by the second modulation frequency, in the first inbound signal received by the second solar panel; and interpreting a third membership of the fourth solar panel in the first solar string based on presence of the second signal component, characterized by the second modulation frequency, in the first inbound signal; and wherein interpreting the configuration of the set of solar panels in the solar array located on the structure comprises interpreting the configuration further based on the third membership.

8. The method of claim 1:

further comprising:

triggering the third solar panel to output a second alternating test signal at the first modulation frequency during a second test period distinct from the first test period;

wherein detecting the first membership of the first solar panel and the second solar panel in the first solar string comprises detecting the first membership of the first solar panel and the second solar panel in the first solar string, distinct from the second solar string, further based on absence of receipt of a second inbound signal, characterized by the first modulation frequency, at the first solar panel and the second solar panel during the second test period; and wherein detecting the second membership of the third solar panel in the second solar string comprises detecting the second membership of the third solar panel and a fourth solar panel, in the set of solar panels, in the second solar string further based on receipt of the second inbound signal at the fourth solar panel during the second test period.

9. The method of claim 8, further comprising:

triggering the first solar panel to transition to a shutdown mode during a third test period following the first test period, the first solar panel outputting a quiescent voltage in the shutdown mode; and based on the first membership, confirming shutdown operation of the first solar panel in response to absence of receipt of a third inbound signal, above the quiescent voltage, at the second solar panel during the third test period;

triggering the third solar panel to transition to the shutdown mode during a fourth test period following the second test period, the third solar panel outputting the quiescent voltage in the shutdown mode; and in response to receipt of a fourth inbound signal, above the quiescent voltage, at the fourth solar panel during the fourth test period:

detecting improper shutdown of the third solar panel based on the second membership;

generating a notification comprising:

a prompt to investigate the third solar panel for improper shutdown; and indicating a location of the third solar panel based on the configuration of the set of solar panels; and serving the notification to an operator.

10. The method of claim 1:

further comprising, prior to the first test period:

at a controller:

wirelessly broadcasting a query; and receiving a set of responses from a population of solar panels, proximal the controller, responsive to the query, the population of solar panels comprising the set of solar panels and a fourth solar panel;

further comprising:

triggering the fourth solar panel to output a third alternating test signal at the first modulation frequency during a third test period distinct from the first test period and the second test period; and identifying the fourth solar panel as outside of the solar array in response to absence of receipt of a second inbound signal, characterized by the first modulation frequency, at solar panels in the set of solar panels during the third test period; and wherein interpreting the configuration of the set of solar panels in the solar array located on the structure comprises interpreting the configuration of the set of solar panels excluding the fourth solar panel.

11. The method of claim 1:

wherein interpreting the configuration of the set of solar panels in the solar array located on the structure comprises generating a visualization of the solar array, the visualization:

identifying a solar string, in the set of solar strings, containing each solar panel in the set of solar panels based on the first membership and the second membership; and further comprising, during a second test period succeeding the first test period:

for each solar panel in the set of solar panels:

accessing an instantaneous power output of the solar panel; and annotating a representation of the solar panel in the visualization with the instantaneous power output of the solar panel; and rendering the visualization on a display of a computing device.

12. The method of claim 1, further comprising, during a second test period succeeding the first test period:

accessing a first instantaneous power output of the first solar panel in the first solar string;

accessing a second instantaneous power output of the second solar panel in the first solar string; and in response to the first instantaneous power output of the first solar panel differing from the second instantaneous power output of the second solar panel:

generating a notification comprising:

a prompt to investigate the first solar panel for improper operation; and indicating a location of the first solar panel in the solar array based on the configuration of the set of solar panels; and serving the notification to an operator.

13. The method of claim 1, further comprising, during a second test period succeeding the first test period:

at the inverter:

assigning a first target bus voltage to the first solar string;

receiving a first output voltage value of the first solar panel; and in response to the first output voltage value of the first solar panel falling below the first target bus voltage and based on the first membership of the first solar panel and the second solar panel in the first solar string:

generating a command to increase voltage output to compensate for reduced output voltage of the first solar panel; and serving the command to the second solar panel.

14. The method of claim 1:

wherein interpreting the configuration of the set of solar panels in the solar array located on the structure comprises, based on the first membership and the second membership:

detecting a first count of solar panels in the first solar string, the first count of solar panels representing the first solar panel and the second solar panel; and detecting a second count of solar panels in the second solar string, the second count of solar panels representing the third solar panel; and further comprising, in response to the first count of solar panels differing from the second count of solar panels:

generating a notification comprising:

a prompt to investigate the second solar string for improper solar string length; and indicating a location of the third solar panel in the solar array based on the configuration of the set of solar panels; and serving the notification to an operator.

15. The method of claim 14, further comprising:

accessing an installation plan for the solar array, the installation plan representing:

target positions of the set of solar panels; and target connectivity between the solar panels to form planned solar strings; and in response to detecting a difference between the virtual map and the installation plan:

annotating the virtual map according to the difference; and serving the virtual map to an operator.

16. The method of claim 1, further comprising:

triggering the first solar panel to output a second alternating test signal at a second modulation frequency during a second test period following the first test period and following reconfiguration of the solar array located on the structure;

detecting the first membership of the first solar panel and the second solar panel in the first solar string based on receipt of a second inbound signal, characterized by the second modulation frequency, at the second solar panel during the second test period;

detecting a third membership of the first solar panel and the third solar panel in the first solar string based on receipt of the second inbound signal, characterized by the second modulation frequency, at the third solar panel during the second test period; and updating the configuration of the set of solar panels in the solar array located on the structure to reflect the third membership in place of the second membership.

17. A method comprising:

triggering solar devices, in a set of solar devices arranged in a set of solar strings in a solar array installed on a structure, to output a direct-current electrical signal in a test mode, the set of solar devices comprising a first solar device, a second solar device, a third solar device, and a fourth solar device;

triggering the first solar device to output a first alternating test signal at a first modulation frequency during a first test period; and identifying a first solar string, in the set of solar strings, containing the first solar device and the second solar device and excluding the third solar device in response to:

receipt of a first inbound signal, characterized by the first modulation frequency, at the second solar device during the first test period; and absence of receipt of the first inbound signal at the third solar device during the first test period.

18. The method of claim 17, further comprising:

triggering solar devices, in the set of solar devices, to wirelessly broadcast test packets;

accessing a set of propagation characteristics of test packets received by the set of solar devices;

accessing a first voltage-to-ground value read by the first solar device;

accessing a second voltage-to-ground value read by the second solar device;

interpreting a first sequence of the first solar device and the second solar device in the first solar string based on a difference between the first voltage-to-ground value and the second voltage-to-ground value;

calculating a set of relative positions of the set of solar devices in the solar array based on the set of propagation characteristics;

generating a virtual map of the solar array comprising representations of the set of solar devices located according to the set of relative positions;

annotating the virtual map with a set of interconnection icons representing wired interconnections between solar devices in each solar string in the set of solar strings, the set of interconnection icons comprising a first interconnection icon representing wired interconnection between the first solar device and the second solar device based on the first sequence and the first membership; and annotating the virtual map with a set of bounding boxes encircling representations of groups of solar devices in each solar string in the set of solar strings, the set of bounding boxes comprising a first bounding box encircling the first solar device and the second solar device and identifying the first solar string based on the first membership.

19. The method of claim 17, further comprising, during a second test period succeeding the first test period:

accessing power outputs of solar devices in the first solar string; and in response to the first solar device outputting a greatest power of all solar devices in the first solar string:

accessing a first output voltage value of the first solar device; and based on the first membership of the first solar device and the second solar device in the first solar string: at the second solar device:

accessing the first output voltage value; and biasing search for a maximum power point voltage at the second solar device proximal the first output voltage value.

20. A method comprising:

triggering solar devices, in a set of solar devices arranged in a set of solar strings in a solar array installed on a structure, to output a direct electrical signal in a test mode, the set of solar devices comprising a first solar device, a second solar device, a third solar device, and a fourth solar device;

triggering the first solar device to output a first alternating test signal at a first modulation frequency during a first test period;

identifying a first solar string, in the set of solar strings, containing the first solar device and the second solar device and excluding the third solar device and the fourth solar device in response to:

receipt of a first inbound signal, characterized by the first modulation frequency, at the second solar device during the first test period; and absence of receipt of the first inbound signal at the third solar device and the fourth solar device during the first test period;

triggering the third solar device to output a second alternating test signal at a second modulation frequency during a second test period;

identifying a second solar string, in the set of solar strings, containing the third solar device and the fourth solar device and excluding the first solar device and the second solar device in response to:

receipt of a second inbound signal, characterized by the second modulation frequency, at the fourth solar device during the second test period; and absence of receipt of the second inbound signal at the first solar device and the second solar device during the second test period; and generating a visual representation of solar devices in the set of solar strings in the solar array located on the structure.

* * * * *